(12) United States Patent
Huang

(10) Patent No.: US 12,280,571 B2
(45) Date of Patent: Apr. 22, 2025

(54) POLYMER FILM AND USES OF THE SAME

(71) Applicant: Chang Chun Petrochemical Co., Ltd., Taipei (TW)

(72) Inventor: Tzu-Jung Huang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 18/440,261

(22) Filed: Feb. 13, 2024

(65) Prior Publication Data

US 2025/0091331 A1   Mar. 20, 2025

(30) Foreign Application Priority Data

Sep. 19, 2023  (CN) .......................... 202311207318.2
Sep. 19, 2023  (TW) ................................ 112135737

(51) Int. Cl.
| | | |
|---|---|---|
| *B32B 27/08* | (2006.01) | |
| *B32B 17/10* | (2006.01) | |
| *B32B 27/22* | (2006.01) | |
| *B32B 27/30* | (2006.01) | |

(52) U.S. Cl.
CPC ........ *B32B 27/08* (2013.01); *B32B 17/10036* (2013.01); *B32B 17/10761* (2013.01); *B32B 27/22* (2013.01); *B32B 27/306* (2013.01); *B32B 2250/03* (2013.01); *B32B 2250/05* (2013.01); *B32B 2307/102* (2013.01); *B32B 2315/08* (2013.01); *B32B 2329/06* (2013.01); *B32B 2419/00* (2013.01); *B32B 2605/00* (2013.01)

(58) Field of Classification Search
None
See application file for complete search history.

(56) References Cited

U.S. PATENT DOCUMENTS

2013/0323516 A1\* 12/2013 Shimamoto ............. B32B 27/30
428/501

FOREIGN PATENT DOCUMENTS

| CN | 111775524 A | 10/2020 |
| TW | 202323405 A | 6/2023 |

\* cited by examiner

*Primary Examiner* — Sheeba Ahmed
(74) *Attorney, Agent, or Firm* — Christensen, Fonder, Dardi & Herbert PLLC

(57) ABSTRACT

A polymer film is provided. The polymer film sequentially includes a first layer, a second layer and a third layer, where the two surfaces of the second layer are in contact with the first layer and the third layer, respectively. The first layer has a first melt index, the second layer has a second melt index, and the third layer has a third melt index. The second melt index ranges from 3.5 g/10 min to 10.0 g/10 min, the first melt index and the third melt index are independently lower than 3.5 g/10 min, and the difference between the second melt index and the first melt index, as well as the difference between the second melt index and the third melt index independently range from 0.2 g/10 min to 8.5 g/10 min.

14 Claims, No Drawings

POLYMER FILM AND USES OF THE SAME

CLAIM FOR PRIORITY

This application claims the benefit of Taiwan Patent Application No. 112135737 filed on Sep. 19, 2023 and the benefit of China Patent Application No. 202311207318.2 filed on Sep. 19, 2023, the subject matters of which are incorporated herein in their entirety by reference.

BACKGROUND OF THE INVENTION

Field of the Invention

The present invention relates to a polymer film, specifically a multi-layer polymer film with a specific melt index (MI) characteristic. Furthermore, the present invention relates to a laminated glass manufactured using the polymer film.

Descriptions of the Related Art

Laminated glass is a glass material with a composite structure formed by interposing a polymer film between two glass sheets and then bonding the glass sheets and the polymer film together through a process of hot-pressing. Due to its superior impact resistance and safety properties, laminated glass finds extensive uses in the automobile and building industries.

The polymer film of the laminated glass can adopt a multilayer structure to impart specific functions to the laminated glass. For example, a laminated glass with acoustic insulation function can be manufactured by employing a polymer film that comprises two outer layers and one intermediate acoustic-insulating layer, with the latter situated between the two outer layers. Generally, the polymer film intended for the manufacture of laminated glass with acoustic insulation function must possess a certain thickness for the acoustic-insulating intermediate layer and exhibits overall structural uniformity to effectively attenuate sound vibrations, thereby achieving acoustic insulation.

SUMMARY OF THE INVENTION

The present invention provides a polymer film with a multi-layer structure. Through the synergistic application of materials with specific melt indexes, the polymer film demonstrates good structural uniformity and is effective in manufacturing laminated glass with excellent acoustic insulation function and no optical defects. Consequently, the polymer film of the present invention is particularly suitable for the manufacture of acoustic-insulating laminated glass.

Thus, an objective of the present invention is to provide a polymer film, which sequentially comprises a first layer, a second layer and a third layer, where the two surfaces of the second layer are in contact with the first layer and the third layer, respectively, wherein the first layer has a first melt index, the second layer has a second melt index, and the third layer has a third melt index, wherein the second melt index ranges from 3.5 g/10 min to 10.0 g/10 min, the first melt index and the third melt index are independently lower than 3.5 g/10 min, and the difference between the second melt index and the first melt index and the difference between the second melt index and the third melt index independently range from 0.2 g/10 min to 8.5 g/10 min.

In some embodiments of the present invention, the first melt index and the third melt index independently range from 1.5 g/10 min to 3.3 g/10 min.

In some embodiments of the present invention, the first melt index, the second melt index and the third melt index are measured in accordance with ASTM D1238 under 190° C. and a loading of 2.16 kg.

In some embodiments of the present invention, the first layer, the second layer and the third layer independently comprise polyvinyl acetal, and the polyvinyl acetal can be selected from the group consisting of poly(vinyl formal), poly(vinyl acetal), poly(vinyl butyral), poly(vinyl pentanal), poly(vinyl hexanal), and combinations thereof. In the preferred embodiments of the present invention, the first layer, the second layer and the third layer independently comprise poly(vinyl butyral).

In some embodiments of the present invention, based on the total number of moles of hydroxyl, acetal group, and acetyl group of polyvinyl acetal comprised in the second layer, the polyvinyl acetal comprised in the second layer has a degree of acetalization ranging from 56 mol % to 74 mol %, a degree of acetylation ranging from 5 mol % to 15 mol %, and a content of hydroxyl ranging from 20 mol % to 30 mol %.

In some embodiments of the present invention, based on the total number of moles of hydroxyl, acetal group, and acetyl group of polyvinyl acetal comprised in each of the first layer and the third layer, the polyvinyl acetal comprised in the first layer and the polyvinyl acetal comprised in the third layer independently have a degree of acetalization ranging from 60 mol % to 75 mol %, a degree of acetylation ranging from 0.1 mol % to 5 mol %, and a content of hydroxyl ranging from 20 mol % to 35 mol %.

In some embodiments of the present invention, the polyvinyl acetal comprised in the second layer has a number average molecular weight (Mn) ranging from 100,000 to 240,000.

In some embodiments of the present invention, the polyvinyl acetal comprised in the first layer and the polyvinyl acetal comprised in the third layer independently have a number average molecular weight (Mn) ranging from 90,000 to 120,000.

In some embodiments of the present invention, the first layer, the second layer and the third layer independently further comprise a plasticizer.

In some embodiments of the present invention, the first layer, the second layer and the third layer independently further comprise a plasticizer. Based on 100 parts by weight of the polyvinyl acetal comprised in the first layer, the amount of the plasticizer comprised in the first layer ranges from 30 parts by weight to 50 parts by weight. Based on 100 parts by weight of the polyvinyl acetal comprised in the second layer, the amount of the plasticizer comprised in the second layer ranges from 55 parts by weight to 85 parts by weight. Based on 100 parts by weight of the polyvinyl acetal comprised in the third layer, the amount of the plasticizer comprised in the third layer ranges from 30 parts by weight to 50 parts by weight.

Another objective of the present invention is to provide a laminate glass, which comprises a first glass sheet, an intermediate film, and a second glass sheet in sequence, wherein the intermediate film is provided by the aforementioned polymer film.

To render the above objectives, technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless otherwise specified, the expressions "a," "the," or the like recited in the specification and the claims should include both singular and plural forms.

Unless otherwise specified, the expressions "first," "second," or the like recited in the specification and the claims are merely used to distinguish the illustrated elements or constituents without special meanings. Those expressions are not used to indicate any priority.

The "melt index (MI)" as recited in the specification and the claims is measured in accordance with ASTM D1238 under 190° C. and a loading of 2.16 kg.

In the specification and the claims, the unit for a number average molecular weight (Mn) is "Dalton".

The present invention provides a polymer film with good structural uniformity. The polymer film of the present invention is effective in manufacturing laminated glass with excellent acoustic insulation function and no optical defects. The subsequent sections provide detailed descriptions of the polymer film of the present invention and its applications.

1. Polymer Film 1.1. Properties of Polymer Film

The polymer film of the present invention sequentially comprises a first layer, a second layer and a third layer, where the two surfaces of the second layer (i.e., the acoustic insulating intermediate layer) are in contact with the first layer and the third layer, respectively.

In the polymer film of the present invention, the second layer has a second melt index ranging from 3.5 g/10 min to 10.0 g/10 min. For example, the second melt index can be 3.5 g/10 min, 3.6 g/10 min, 3.7 g/10 min, 3.8 g/10 min, 3.9 g/10 min, 4.0 g/10 min, 4.1 g/10 min, 4.2 g/10 min, 4.3 g/10 min, 4.4 g/10 min, 4.5 g/10 min, 4.6 g/10 min, 4.7 g/10 min, 4.8 g/10 min, 4.9 g/10 min, 5.0 g/10 min, 5.1 g/10 min, 5.2 g/10 min, 5.3 g/10 min, 5.4 g/10 min, 5.5 g/10 min, 5.6 g/10 min, 5.7 g/10 min, 5.8 g/10 min, 5.9 g/10 min, 6.0 g/10 min, 6.1 g/10 min, 6.2 g/10 min, 6.3 g/10 min, 6.4 g/10 min, 6.5 g/10 min, 6.6 g/10 min, 6.7 g/10 min, 6.8 g/10 min, 6.9 g/10 min, 7.0 g/10 min, 7.1 g/10 min, 7.2 g/10 min, 7.3 g/10 min, 7.4 g/10 min, 7.5 g/10 min, 7.6 g/10 min, 7.7 g/10 min, 7.8 g/10 min, 7.9 g/10 min, 8.0 g/10 min, 8.1 g/10 min, 8.2 g/10 min, 8.3 g/10 min, 8.4 g/10 min, 8.5 g/10 min, 8.6 g/10 min, 8.7 g/10 min, 8.8 g/10 min, 8.9 g/10 min, 9.0 g/10 min, 9.1 g/10 min, 9.2 g/10 min, 9.3 g/10 min, 9.4 g/10 min, 9.5 g/10 min, 9.6 g/10 min, 9.7 g/10 min, 9.8 g/10 min, 9.9 g/10 min, or 10.0 g/10 min, or within a range between any two of the values described herein. The second layer with the designated melt index is capable of attenuating sound vibrations, thereby optimizing acoustic insulation function.

In the polymer film of the present invention, the first layer has a first melt index and the third layer has a third melt index. The first melt index and the third melt index are independently lower than 3.5 g/10 min. Preferably, the first melt index and the third melt index independently range from 1.5 g/10 min to 3.3 g/10 min. For example, the first melt index and the third melt index can independently be 1.5 g/10 min, 1.6 g/10 min, 1.7 g/10 min, 1.8 g/10 min, 1.9 g/10 min, 2.0 g/10 min, 2.1 g/10 min, 2.2 g/10 min, 2.3 g/10 min, 2.4 g/10 min, 2.5 g/10 min, 2.6 g/10 min, 2.7 g/10 min, 2.8 g/10 min, 2.9 g/10 min, 3.0 g/10 min, 3.1 g/10 min, 3.2 g/10 min, 3.3 g/10 min, or 3.4 g/10 min, or within a range between any two of the values described herein.

In the polymer film of the present invention, the difference between the second melt index and the first melt index, as well as the difference between the second melt index and the third melt index, independently range from 0.2 g/10 min to 8.5 g/10 min. For example, the difference between the second melt index and the first melt index, as well as the difference between the second melt index and the third melt index, can independently be 0.2 g/10 min, 0.3 g/10 min, 0.4 g/10 min, 0.5 g/10 min, 0.6 g/10 min, 0.7 g/10 min, 0.8 g/10 min, 0.9 g/10 min, 1.0 g/10 min, 1.1 g/10 min, 1.2 g/10 min, 1.3 g/10 min, 1.4 g/10 min, 1.5 g/10 min, 1.6 g/10 min, 1.7 g/10 min, 1.8 g/10 min, 1.9 g/10 min, 2.0 g/10 min, 2.1 g/10 min, 2.2 g/10 min, 2.3 g/10 min, 2.4 g/10 min, 2.5 g/10 min, 2.6 g/10 min, 2.7 g/10 min, 2.8 g/10 min, 2.9 g/10 min, 3.0 g/10 min, 3.1 g/10 min, 3.2 g/10 min, 3.3 g/10 min, 3.4 g/10 min, 3.5 g/10 min, 3.6 g/10 min, 3.7 g/10 min, 3.8 g/10 min, 3.9 g/10 min, 4.0 g/10 min, 4.1 g/10 min, 4.2 g/10 min, 4.3 g/10 min, 4.4 g/10 min, 4.5 g/10 min, 4.6 g/10 min, 4.7 g/10 min, 4.8 g/10 min, 4.9 g/10 min, 5.0 g/10 min, 5.1 g/10 min, 5.2 g/10 min, 5.3 g/10 min, 5.4 g/10 min, 5.5 g/10 min, 5.6 g/10 min, 5.7 g/10 min, 5.8 g/10 min, 5.9 g/10 min, 6.0 g/10 min, 6.1 g/10 min, 6.2 g/10 min, 6.3 g/10 min, 6.4 g/10 min, 6.5 g/10 min, 6.6 g/10 min, 6.7 g/10 min, 6.8 g/10 min, 6.9 g/10 min, 7.0 g/10 min, 7.1 g/10 min, 7.2 g/10 min, 7.3 g/10 min, 7.4 g/10 min, 7.5 g/10 min, 7.6 g/10 min, 7.7 g/10 min, 7.8 g/10 min, 7.9 g/10 min, 8.0 g/10 min, 8.1 g/10 min, 8.2 g/10 min, 8.3 g/10 min, 8.4 g/10 min, or 8.5 g/10 min, or within a range between any two of the values described herein.

The inventors discovered that, the polymer film achieves good structural uniformity and consequently, produces laminated glass with excellent acoustic insulation function and no optical defects only when each melt index of the first layer, the second layer and the third layer falls within the specified range. Additionally, the difference between the second melt index and the first melt index, as well as the difference between the second melt index and the third melt index, must also fall within the specified range. The term "good structural uniformity" refers to the complete and continuous existence of the first layer, the second layer and the third layer throughout the entire polymer film without disruption and disconnection in the second layer. Furthermore, the second layer must have a desired thickness and good thickness uniformity (with a thickness deviation not higher than 0.025 mm).

1.2. Constitution of Polymer Film

The polymer film of the present invention comprises a first layer, a second layer and a third layer in sequence, and the two surfaces of the second layer are in contact with the first layer and the third layer, respectively. In other words, the second layer lies between the first layer and the third layer. Alternatively, the polymer film of the present invention can consist essentially of or consist of a first layer, a second layer and a third layer in sequence, and the two surfaces of the second layer are in contact with the first layer and the third layer, respectively.

In the polymer film of the present invention, the first layer, the second layer and the third layer may independently comprise polyvinyl acetal as an essential constituent, and the first layer, the second layer and the third layer may independently further comprise other optional constituents, such as a plasticizer or other conventional additives, depending on the needs. As used herein, the expression "the first layer, the second layer and the third layer independently comprise polyvinyl acetal" means that the first layer, the second layer and the third layer each comprise polyvinyl acetal, and the polyvinyl acetal comprised in these layers can be identical or different. In some embodiments of the present invention, the first layer, the second layer and the third layer independently comprise polyvinyl acetal and a plasticizer, and the polyvinyl acetal and plasticizer comprised in these layers can be identical or different. Alternatively, the first layer, the second layer and the third layer independently consist essentially of or consist of polyvinyl acetal and a plasticizer, and the polyvinyl acetal and plasticizer comprised in these layers can be identical or different.

The first layer, the second layer and the third layer of the polymer film of the present invention may each be independently a single-layer film composed of one layer or a multilayer film composed of multiple layers, as long as the polymer film as a whole possesses the designated melt indexes. In some embodiments of the present invention, the first layer, the second layer and the third layer each are a single-layer film composed of one single layer.

1.2.1. Polyvinyl Acetal

Examples of polyvinyl acetal include, but are not limited to, poly(vinyl formal), poly(vinyl acetal), poly(vinyl butyral), poly(vinyl pentanal), and poly(vinyl hexanal). The above polyvinyl acetal can either be used alone or in a mixture of two or more. In the preferred embodiments of the present invention, poly(vinyl butyral) is used.

1.2.1.1. Polyvinyl Acetal Comprised in the Second Layer

In some embodiments of the present invention, the polyvinyl acetal comprised in the second layer has a number average molecular weight (Mn) ranging from 100,000 to 240,000. For example, the Mn of the polyvinyl acetal comprised in the second layer can be 100,000, 105,000, 110,000, 115,000, 120,000, 125,000, 130,000, 135,000, 140,000, 145,000, 150,000, 155,000, 160,000, 165,000, 170,000, 175,000, 180,000, 185,000, 190,000, 195,000, 200,000, 205,000, 210,000, 215,000, 220,000, 225,000, 230,000, 235,000, or 240,000, or within a range between any two of the values described herein. In general, the higher the number average molecular weight of the polymer, the higher the degree of polymerization, leading to lower fluidity and melt index. Conversely, the lower the number average molecular weight of polymer, the higher the melt index of polymer.

In some embodiments of the present invention, the polyvinyl acetal comprised in the second layer can have a content of acetal group (i.e., a degree of acetalization) ranging from 56 mol % to 74 mol %, based on the total number of moles of hydroxyl, acetal group, and acetyl group present in the polyvinyl acetal. For example, based on the total number of moles of hydroxyl, acetal group, and acetyl group present in the polyvinyl acetal, the degree of acetalization of the polyvinyl acetal comprised in the second layer can be 56 mol %, 56.5 mol %, 57 mol %, 57.5 mol %, 58 mol %, 58.5 mol %, 59 mol %, 59.5 mol %, 60 mol %, 60.5 mol %, 61 mol %, 61.5 mol %, 62 mol %, 62.5 mol %, 63 mol %, 63.5 mol %, 64 mol %, 64.5 mol %, 65 mol %, 65.5 mol %, 66 mol %, 66.5 mol %, 67 mol %, 67.5 mol %, 68 mol %, 68.5 mol %, 69 mol %, 69.5 mol %, 70 mol %, 70.5 mol %, 71 mol %, 71.5 mol %, 72 mol %, 72.5 mol %, 73 mol %, 73.5 mol %, or 74 mol %, or within a range between any two of the values described herein. In the preferred embodiments of the present invention, the polyvinyl acetal comprised in the second layer can have a degree of acetalization ranging from 60 mol % to 71 mol %, based on the total number of moles of hydroxyl, acetal group, and acetyl group present in the polyvinyl acetal.

In some embodiments of the present invention, the polyvinyl acetal comprised in the second layer has a content of acetyl group (i.e., a degree of acetylization) ranging from 5 mol % to 15 mol %, based on the total number of moles of hydroxyl, acetal group, and acetyl group present in the polyvinyl acetal. For example, based on the total number of moles of hydroxyl, acetal group, and acetyl group present in the polyvinyl acetal, the degree of acetylization of the polyvinyl acetal comprised in the second layer can be 5 mol %, 5.5 mol %, 6 mol %, 6.5 mol %, 7 mol %, 7.5 mol %, 8 mol %, 8.5 mol %, 9 mol %, 9.5 mol %, 10 mol %, 10.5 mol %, 11 mol %, 11.5 mol %, 12 mol %, 12.5 mol %, 13 mol %, 13.5 mol %, 14 mol %, 14.5 mol %, or 15 mol %, or within a range between any two of the values described herein. In the preferred embodiments of the present invention, the polyvinyl acetal comprised in the second layer can have a degree of acetylization ranging from 7 mol % to 12 mol %, based on the total number of moles of hydroxyl, acetal group, and acetyl group present in the polyvinyl acetal.

In some embodiments of the present invention, the polyvinyl acetal comprised in the second layer has a content of hydroxyl ranging from 20 mol % to 30 mol %, based on the total number of moles of hydroxyl, acetal group, and acetyl group present in the polyvinyl acetal. For example, based on the total number of moles of hydroxyl, acetal group, and acetyl group present in the polyvinyl acetal, the content of hydroxyl of the polyvinyl acetal comprised in the second layer can be 20 mol %, 20.5 mol %, 21 mol %, 21.5 mol %, 22 mol %, 22.5 mol %, 23 mol %, 23.5 mol %, 24 mol %, 24.5 mol %, 25 mol %, 25.5 mol %, 26 mol %, 26.5 mol %, 27 mol %, 27.5 mol %, 28 mol %, 28.5 mol %, 29 mol %, 29.5 mol %, or 30 mol %, or within a range between any two of the values described herein. In the preferred embodiments of the present invention, the polyvinyl acetal comprised in the second layer can have a content of hydroxyl ranging from 22 mol % to 28 mol %, based on the total number of moles of hydroxyl, acetal group, and acetyl group present in the polyvinyl acetal. The lower the hydroxyl content of polyvinyl acetal, the higher the amount of the plasticizer that can be absorbed by the polyvinyl acetal.

1.2.1.2. Polyvinyl Acetal Comprised in the First Layer and the Third Layer

In some embodiments of the present invention, the polyvinyl acetal comprised in the first layer and the polyvinyl acetal comprised in the third layer independently have a number average molecular weight (Mn) ranging from 90,000 to 120,000. For example, the Mn of the polyvinyl acetal comprised in the first layer and the Mn of the polyvinyl acetal comprised in the third layer can independently be 90,000, 91,000, 92,000, 93,000, 94,000, 95,000, 96,000, 97,000, 98,000, 99,000, 100,000, 101,000, 102,000, 103,000, 104,000, 105,000, 106,000, 107,000, 108,000, 109,000, 110,000, 111,000, 112,000, 113,000, 114,000, 115,000, 116,000, 117,000, 118,000, 119,000, or 120,000, or within a range between any two of the values described herein.

In some embodiments of the present invention, the polyvinyl acetal comprised in each of the first layer and the third layer can independently have a content of acetal group (i.e., a degree of acetalization) ranging from 60 mol % to 75 mol %, based on the total number of moles of hydroxyl, acetal group, and acetyl group present in the polyvinyl acetal comprised in each of the first layer and the third layer. For example, based on the total number of moles of hydroxyl, acetal group, and acetyl group present in the polyvinyl acetal comprised in each of the first layer and the third layer, the degree of acetalization of the polyvinyl acetal comprised in each of the first layer and the third layer can independently be 60 mol %, 60.5 mol %, 61 mol %, 61.5 mol %, 62 mol %, 62.5 mol %, 63 mol %, 63.5 mol %, 64 mol %, 64.5 mol %, 65 mol %, 65.5 mol %, 66 mol %, 66.5 mol %, 67 mol %, 67.5 mol %, 68 mol %, 68.5 mol %, 69 mol %, 69.5 mol %, 70 mol %, 70.5 mol %, 71 mol %, 71.5 mol %, 72 mol %, 72.5 mol %, 73 mol %, 73.5 mol %, 74 mol %, 74.5 mol %, or 75 mol %, or within a range between any two of the values described herein. In the preferred embodiments of the present invention, the polyvinyl acetal comprised in each of the first layer and the third layer can independently have a degree of acetalization ranging from 70 mol % to 72 mol %, based on the total number of moles of hydroxyl, acetal group, and acetyl group present in the polyvinyl acetal comprised in each of the first layer and the third layer.

In some embodiments of the present invention, the polyvinyl acetal comprised in each of the first layer and the third layer independently have a content of acetyl group (i.e., a degree of acetylization) ranging from 0.1 mol % to 5 mol %, based on the total number of moles of hydroxyl, acetal group, and acetyl group present in the polyvinyl acetal comprised in each of the first layer and the third layer. For example, based on the total number of moles of hydroxyl, acetal group, and acetyl group present in the polyvinyl acetal comprised in each of the first layer and the third layer, the degree of acetylization of the polyvinyl acetal comprised in each of the first layer and the third layer can independently be 0.1 mol %, 0.5 mol %, 1 mol %, 1.5 mol %, 2 mol %, 2.5 mol %, 3 mol %, 3.5 mol %, 4 mol %, 4.5 mol %, or 5 mol %, or within a range between any two of the values described herein. In the preferred embodiments of the present invention, the polyvinyl acetal comprised in each of the first layer and the third layer can independently have a degree of acetylization ranging from 0.5 mol % to 1.5 mol %, based on the total number of moles of hydroxyl, acetal group, and acetyl group present in the polyvinyl acetal comprised in each of the first layer and the third layer.

In some embodiments of the present invention, the polyvinyl acetal comprised in each of the first layer and the third layer can independently have a content of hydroxyl ranging 20 mol % to 35 mol %, based on the total number of moles of hydroxyl, acetal group, and acetyl group present in the polyvinyl acetal comprised in each of the first layer and the third layer. For example, based on the total number of moles of hydroxyl, acetal group, and acetyl group present in the polyvinyl acetal comprised in each of the first layer and the third layer, the content of hydroxyl of the polyvinyl acetal comprised in each of the first layer and the third layer can independently be 20 mol %, 20.5 mol %, 21 mol %, 21.5 mol %, 22 mol %, 22.5 mol %, 23 mol %, 23.5 mol %, 24 mol %, 24.5 mol %, 25 mol %, 25.5 mol %, 26 mol %, 26.5 mol %, 27 mol %, 27.5 mol %, 28 mol %, 28.5 mol %, 29 mol %, 29.5 mol %, 30 mol %, 30.5 mol %, 31 mol %, 31.5 mol %, 32 mol %, 32.5 mol %, 33 mol %, 33.5 mol %, 34 mol %, 34.5 mol %, or 35 mol %, or within a range between any two of the values described herein. In the preferred embodiments of the present invention, the polyvinyl acetal comprised in each of the first layer and the third layer can independently have a content of hydroxyl ranging from 27 mol % to 29 mol %, based on the total number of moles of hydroxyl, acetal group, and acetyl group present in the polyvinyl acetal comprised in each of the first layer and the third layer.

1.2.2. Plasticizer

As used herein, a plasticizer, also referred to as a plasticizing agent, is a chemical substance capable of modifying the plasticity of a thermoplastic resin. Generally, the higher the amount of the added plasticizer, the higher the melt index of the polymer film. The types of the plasticizer are not particularly limited, and the plasticizer comprised in each of the first layer, the second layer and the third layer may be identical or different. Examples of the plasticizer include, but are not limited to, esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis [2-(2-butoxyethoxy)ethyl] adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof. In the appended examples, triethylene glycol bis(2-ethylhexanoate) is used as the plasticizer.

In some embodiments of the present invention, based on 100 parts by weight of the polyvinyl acetal comprised in the first layer, the amount of the plasticizer comprised in the first layer ranges from 30 parts by weight to 50 parts by weight. For example, based on 100 parts by weight of the polyvinyl acetal comprised in the first layer, the amount of the plasticizer comprised in the first layer can be 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, or 50 parts by weight, or within a range between any two of the values described herein. In the preferred embodiments of the present invention, based on 100 parts by weight of the polyvinyl acetal comprised in the first layer, the amount of the plasticizer comprised in the first layer ranges from 38 parts by weight to 44 parts by weight.

In some embodiments of the present invention, based on 100 parts by weight of the polyvinyl acetal comprised in the second layer, the amount of the plasticizer comprised in the second layer ranges from 55 parts by weight to 85 parts by weight. For example, based on 100 parts by weight of the polyvinyl acetal comprised in the second layer, the amount of the plasticizer comprised in the second layer can be 55 parts by weight, 56 parts by weight, 57 parts by weight, 58 parts by weight, 59 parts by weight, 60 parts by weight, 61 parts by weight, 62 parts by weight, 63 parts by weight, 64 parts by weight, 65 parts by weight, 66 parts by weight, 67 parts by weight, 68 parts by weight, 69 parts by weight, 70 parts by weight, 71 parts by weight, 72 parts by weight, 73 parts by weight, 74 parts by weight, 75 parts by weight, 76 parts by weight, 77 parts by weight, 78 parts by weight, 79 parts by weight, 80 parts by weight, 81 parts by weight, 82 parts by weight, 83 parts by weight, 84 parts by weight, or 85 parts by weight, or within a range between any two of the values described herein. In the preferred embodiments of the present invention, based on 100 parts by weight of the polyvinyl acetal comprised in the second layer, the amount of the plasticizer comprised in the second layer ranges from 60 parts by weight to 80 parts by weight.

In some embodiments of the present invention, based on 100 parts by weight of the polyvinyl acetal comprised in the third layer, the amount of the plasticizer comprised in the third layer ranges from 30 parts by weight to 50 parts by weight. For example, based on 100 parts by weight of the polyvinyl acetal comprised in the third layer, the amount of the plasticizer comprised in the third layer can be 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, or 50 parts by weight, or within a range between any two of the values described herein. In the preferred embodiments of the present invention, based on 100 parts by weight of the polyvinyl acetal comprised in the third layer, the amount of the plasticizer comprised in the third layer ranges from 38 parts by weight to 44 parts by weight.

1.2.3. Other Conventional Additives

Conventional additives encompass substances that can adaptively improve the workability of the polymer film during its manufacture or impart specific functions to the polymer film. The aforementioned specific functions include, but are not limited to, one or more of the following: thermal insulation function, reflection function, anti-reflection function, refraction function, anti-refraction function, light-splitting function, and dimming function.

Examples of the conventional additives include, but are not limited to, dyes, pigments, stabilizers, antioxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. For example, the polymer film can comprise a dye or a pigment to form a colored polymer film. Alternatively, the polymer film can comprise an ultraviolet absorber or an infrared absorber to form a polymer film with an anti-ultraviolet function or a polymer film with an anti-infrared function. The above-mentioned additives can be used alone or in a mixture of two or more. Additionally, the above-mentioned additives can be added into one or more of the first layer, the second layer and the third layer of the polymer film.

1.3. Other Properties of Polymer Film

With the proviso that the polymer film meets the specified melt index requirements, the total thickness of the polymer film, as well as the thickness of each of the first layer, the second layer, and the third layer of the polymer film, can be adjusted depending on the need. Generally, the total thickness of the polymer film of the present invention can range from 0.1 mm to 2.5 mm. For example, the total thickness of the polymer film of the present invention can be 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, 1.2 mm, 1.25 mm, 1.3 mm, 1.35 mm, 1.4 mm, 1.45 mm, 1.5 mm, 1.55 mm, 1.6 mm, 1.65 mm, 1.7 mm, 1.75 mm, 1.8 mm, 1.85 mm, 1.9 mm, 1.95 mm, 2.0 mm, 2.05 mm, 2.1 mm, 2.15 mm, 2.2 mm, 2.25 mm, 2.3 mm, 2.35 mm, 2.4 mm, 2.45 mm, or 2.5 mm, or within a range between any two of the values described herein. In the appended examples, the thickness of the polymer film is 0.76 mm to 0.85 mm.

In some embodiments of the present invention, the thickness of the first layer and the third layer can independently range from 250 µm to 450 µm. For example, the thickness of the first layer and the third layer can independently be 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, or 450 µm, or within a range between any two of the values described herein.

In some embodiments of the present invention, the thickness of the second layer can range from 50 µm to 250 µm. For example, the thickness of the second layer can be 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, or 250 µm, or within a range between any two of the values described herein.

1.4. Manufacture of Polymer Film

The method for manufacturing the polymer film of the present invention is not particularly limited. For example, the polymer film of the present invention may be manufactured by mixing, dry-stirring and compounding the polyvinyl acetal and optional constituents (e.g., a plasticizer) to obtain a polymer composition. This polymer composition is then used to provide a polymer film through a conventional film-forming method, followed by performing a machine embossing step on the surface of the polymer film. Examples of the conventional method for providing the polymer film include, but are not limited to, a calendering method, a casting method, an extrusion stretching method, a direct extruding method, and an extrusion blowing method.

In some embodiments of the present invention, the polymer film is manufactured as follows, but the present invention is not limited thereto. Initially, a first polymer film composition for manufacturing the first layer and the third layer is prepared, and a second polymer film composition for manufacturing the second layer is also prepared. Subsequently, the first polymer film composition and the second polymer film composition are introduced into a co-extruder to form the polymer film of the present invention through co-extruding.

The first polymer film composition and the second polymer film composition can independently be prepared as follows, but the present invention is not limited thereto. Initially, the selected resinous polyvinyl acetal is pre-heated in an oven. Subsequently, the pre-heated polyvinyl acetal and a plasticizer undergo dry stirring. Afterward, the dry-stirred mixture is compounded using a twin-screw compounder to obtain the desired first polymer film composition or second polymer film composition.

Without being restricted by theories, it is believed that the melt index of the polymer film can be controlled by adjusting the amount of functional groups in the polymer, the amount of the plasticizer comprised in the polymer film, and the absorption uniformity of the plasticizer in the polymer. The absorption uniformity of the plasticizer in the polymer can be regulated by controlling factors such as the pre-heating temperature, dry-stirring temperature, dry-stirring time, compounding temperature, and compounding time during the manufacture of the polymer film. Generally, pre-heating can open the pores inside the resin in advance and slightly increase the fluidity of the resin, facilitating its subsequent mixing with the plasticizer. A higher dry-stirring temperature can further open the pores inside the resin, aiding in the absorption of the plasticizer. A longer dry-stirring time promotes a more uniform mixture of the resin and the plasticizer. A higher compounding temperature increases the fluidity of the plasticizer, enhancing the compatibility of the resin and the plasticizer. A longer compounding time ensures a more uniform mixing of the resin and the plasticizer. In addition, the amount of functional groups in the polymer will also influence the uniformity of plasticizer absorption in the polymer. Considering the above, in the appended examples, besides adjusting the constitution ratio of the first polymer film composition and the second polymer film composition, the polymer film with the melt index features of the present invention can also be manufactured by controlling the following conditions: the pre-heating temperature ranges from 30° C. to 45° C.; the dry-stirring temperature ranges from 30° C. to 45° C.; the dry-stirring time lasts from 2 minutes to 3 minutes; the compounding temperature ranges from 180° C. to 210° C.; and the compounding time lasts from 8 minutes to 12 minutes.

The polymer film formed through co-extruding can be further formed with a concavo-convex structure on its surface through pre-heating and machine embossing to facilitate de-airing. Machine embossing involves the process of forming textures on the surface of the prepared polymer film using a roller. Methods for machine embossing include, but are not limited to, an embossing roller method or a calendaring roller method, with the embossing roller method being preferred. The available texture types provided by the machine embossing are not limited and include rhombus texture, line texture, sawtooth texture, square texture, taper texture, circle texture, sub-circle texture, and irregular texture. These texture types can be used alone or in a combination of two or more. The conditions for pre-heating and machine embossing can be adaptively adjusted based on the composition of the polymer film used.

2. Laminated Glass

The polymer film of the present invention can be used to manufacture a laminated glass. Consequently, the present invention also provides a laminated glass, which comprises a first glass sheet, an intermediate film, and a second glass sheet in sequence, wherein the intermediate film is provided by the aforementioned polymer film.

The first glass sheet and the second glass sheet may be identical or different. The first glass sheet and the second glass sheet can independently be any conventional glass sheet for manufacturing laminated glass. Conventional glass sheets used for laminated glass production include, but are not limited to, float glass sheets, tempered glass sheets, wired glass sheets, or plain plate-glass sheets, but the present invention is not limited thereto. In the appended examples, float glass sheets are used as both the first and second glass sheets.

The laminated glass of the present invention can be manufactured using any known laminated glass manufacturing method in the field. Generally, the method for manufacturing laminated glass can be broadly divided to a pre-pressing step and an autoclave pressing step. The pre-pressing step proceeds as follows. Initially, a polymer film is interposed between two glass sheets to obtain a laminated object. Subsequently, the conveying rate of the conveyor belt of roller press is set to 2 m/min to 8 m/min, the oven temperature is set to 160° C. to 190° C., and the roller pressure is set to 3 kg/cm² to 10 kg/cm². The laminated object is conveyed through the oven and the rollers in sequence, with the distance between the rollers set to 4.5 mm to 6.5 mm. Following this, the roller-pressed laminated object is cooled to room temperature, completing the pre-pressing. Next, the pre-pressed laminated object is placed in an autoclave for the autoclave pressing step. The autoclave pressing step involves subjecting the pre-pressed laminated object to hot-pressing under high pressure and temperature conditions for 100 minutes to 150 minutes to produce laminated glass. Typically, the high pressure and temperature conditions refer to a pressure ranging from 10 bar to 15 bar and a temperature ranging from 100° C. to 150° C.

3. Examples 3.1. Testing Methods

The present invention is further illustrated by the embodiments hereinafter, wherein the testing instruments and methods are as follows.

[Measurement of Acetalization Degree, Acetylization Degree and Hydroxyl Content of Polyvinyl Acetal]

The acetalization degree, acetylization degree and hydroxyl content of polyvinyl acetal are measured in accordance with JIS K6728:1977.

[Measurement of Molecular Weight Distribution of Polyvinyl Acetal]

The molecular weight distribution of polyvinyl acetal is determined using gel permeation chromatography (GPC). Polyvinyl acetal is dissolved in tetrahydrofuran (THF) and analyzed by GPC under the conditions below. The molecular weight (Mn) of polyvinyl acetal is calculated based on the ratio corresponding to the area of standard polystyrene (Water PS STD).

Device: Waters 1515 PUMP system
Detector: Waters 2414 RI
Elution condition: 1.0 mL/min, THF
Column: Waters Styragel HR5 THF, Waters Styragel HR4 THF, Waters Styragel HR3 THF, Waters Styragel HR1 THF

[Measurement of Melt Index]

The melt index of the polymer film is measured using a melt index tester (model: D4002HV, available from Dynisco) in accordance with ASTM D1238. The calculation of the weight of the outflow is performed in accordance with Manual Operation Method (Method A). The measuring conditions includes a temperature of 190° C. and a loading of 2.16 kg, and a sample weight of 6 g for the polymer film. The detailed measuring steps are as follows. Initially, the polymer film sample is placed in a constant temperature and humidity chamber at 23° C. and a relative humidity of 25% for 2 hours. Subsequently, the melt index tester is powered on and heated to 190° C., and the sample is added and packed into a cylindrical barrel. A standard weight, applied through the piston and weights (total weight: 2.16 kg), is placed on the sample in the cylindrical barrel, and the outflow of sample within 120 seconds is excluded from the calculation. After 120 seconds, the formal test begins. The amount of sample outflow is weighed every 200 seconds three times, and the melt index is calculated according to the following equation. The unit of melt index is g/10 min.

$$MI = \frac{\text{Total weight of outflow (unit: g)}}{\text{Collecting time of outflow (10 minutes)}}$$

[Evaluation of Continuous Layer Structure]

The polymer film is examined using an optical microscope (model: BX51, available from Olympus) to ascertain the continuity of the structure in each layer. A sample of the polymer film measuring 100 cm×5 cm is prepared, where 100 cm represents the length in the transverse direction and 5 cm represents the length in the machine direction. The sample is clamped at the two short sides using a clamping jig, positioning the long side (i.e., the cutting surface) of the polymer film towards the objective lens. The optical microscope setup includes an objective lens with a magnification of 5×. The evaluation criteria are as follows. If the structure of each layer in the polymer film is continuous without any observed discontinuity, the structural uniformity is considered good, and the result is recorded as "○". If discontinuity is observed in any layer of the polymer film, indicating poor structural uniformity, the result is recorded as "×".

[Evaluation of Layer Thickness]

The thickness of the second layer (intermediate layer) of the polymer film is measured using an optical microscope (model: BX51, available from Olympus), and the thickness is calculated with the built-in software (Motic Image Plus 2.0) of the optical microscope. A sample of the polymer film measuring 100 cm×5 cm is prepared, where 100 cm represents the length in the transverse direction and 5 cm represents the length in the machine direction. The sample is clamped at the two short sides using a clamping jig, positioning the long side (i.e., the cutting surface) of the polymer film towards the objective lens. The optical microscope arrangement includes an objective lens with a magnification of 5×. The measuring procedure is as follows: starting from the left boundary, the thickness of the second layer is measured at 1 (one) cm, 25 cm, 50 cm, 75 cm, and 100 cm, respectively, to obtain five thickness values. The evaluation criteria are as follows. If all five values fall within the range of 0.1 mm to 0.15 mm, the result is deemed good and recorded as "○". If any one of the five values falls outside this range, the result is considered poor and recorded as "×". If it is not possible to measure all five values (i.e., only four values are measured), the result is deemed not applicable and recorded as "NA".

In addition, among the five values, the deviation in the thickness of the second layer is determined by subtracting the minimum value from the maximum value and recorded. When the deviation is not more than 0.025 mm, it indicates good thickness uniformity. If the deviation is larger than 0.025 mm, it indicates poor thickness uniformity. In the cases where five values cannot be measured, the deviation of the thickness of the second layer is recorded as "NA (Not Applicable)".

[Evaluation of Loss Factor]

The loss factor of the laminated glass is evaluated in accordance with ISO 16940:2008, Measurement of Mechanical Impedance (MIM). The sample is prepared as follows. Initially, a polymer film with a length of 300 mm and a width of 25 mm is interposed between two float glass sheets (length: 300 mm, width: 25 mm, thickness: 2 mm) to obtain a laminated object. Then, the laminated object is subjected to a pre-pressing step and an autoclave pressing step to obtain a laminated glass, wherein the pre-pressing step and the autoclave pressing step are as described above. Next, the laminated glass is placed in a constant temperature and humidity chamber at 23° C. and a relative humidity of 55% for 2 hours. Subsequently, the loss factor test is performed as follows. Initially, the central part of the laminated glass is secured to a vibration shaker, and the laminated glass is oscillated at an ambient temperature of 20° C. The force that oscillating the laminated glass and the frequency of oscillation are measured by using an impedance head, and the obtained values are converted to damping loss factor by an analysis system. The calculation is performed according to first oscillation mode with the half-power method. When the damping loss factor of the laminated glass at 20° C. is larger than 0.25, it indicates that the laminated glass can provide a good acoustic insulation effect.

[Evaluation of Optical Distortion]

Initially, a laminated glass of 30 cm×30 cm as a test sample as well as a projector (model: NP-P451X, available from NEC, light source: 4500 ANSI Lumens), a sample holder, and a white screen are prepared. The projector, sample holder, and white screen are placed in a dark room, wherein the sample holder is placed between the projector and the white screen, and the distance between the projector and the sample holder, as well as the distance between the sample holder and the white screen, are both 1.5 m. The test sample is placed on the sample holder, and the angle of the test sample is adjusted such that the test sample is 15 degrees tilted toward the projector with respect to the axis vertical to the ground. The light source of the projector is turned on to allow the projected light to pass through the test sample and project onto the white screen. The white screen is visually observed to check for any notable brightness or darkness distinctions. If none are observed, the laminated glass does not exhibit fine lines (optical ripples), and the result of optical distortion is recorded as "no". If notable distinctions are observed, the laminated glass has fine lines (optical ripples), and the result of optical distortion is recorded as "yes".

3.2. Manufacture and Property Measurement of Polymer Film 3.2.1. First Layer and Third Layer of Polymer Film 100 parts by weight of poly(vinyl butyral) (PVB, available from Chang Chun Petrochemical Co., Ltd.) was pre-heated in an oven at 30° C. to 45° C. for 1 (one) minute. Then, the pre-heated PVB and a plasticizer were dry-stirred at a first dry-stirring temperature for a first dry-stirring time to obtain a first dry-stirred mixture. Afterward, the first dry-stirred mixture was compounded using a twin-screw compounder at a first compounding temperature for a first compounding time to obtain a first polymer film composition of Examples 1 to 11 and Comparative Examples 1 to 9, respectively. The amount of the plasticizer is shown in Table 1-1 and Table 2-1; and the first dry-stirring temperature, the first dry-stirring time, the first compounding temperature and the first compounding time are shown in Table 1-2 and Table 2-2. The properties of the PVB, including the Mn, degree of acetalization, degree of acetylization and hydroxyl content, were measured according to the aforementioned testing methods, and the results are shown in Table 1-1 and Table 2-1. The units for the degree of acetalization, degree of acetylization and hydroxyl content are all mol %.

The first polymer film compositions of Examples 1 to 11 and Comparative Examples 1 to 9 were placed in an extruder to obtain a single-layer polymer film (hereinafter "first single-layer polymer film"), respectively. The melt indexes of the first single-layer polymer films were measured according to the aforementioned testing methods, and the results are shown in Table 1-5 and Table 2-5. Each of the first polymer film compositions was used as the material for the first layer and the third layer of the polymer film of Examples 1 to 11 and Comparative Examples 1 to 9, as described below. Thus, the melt index of each of the first single-layer polymer films represents the melt index of each of the first layer and the third layer of the polymer film, that is, the first melt index and the third melt index. Since the third melt index is identical to the first melt index, only the results of the first melt index are listed in the tables.

3.2.2. Second Layer of Polymer Film 100 parts by weight of poly(vinyl butyral) (PVB, available from Chang Chun Petrochemical Co., Ltd.) was pre-heated in an oven at 30° C. to 45° C. for 1 (one) minute. Then, the pre-heated PVB and a plasticizer were dry-stirred at a second dry-stirring temperature for a second dry-stirring time to obtain a second dry-stirred mixture. Afterward, the second dry-stirred mixture was compounded using a twin-screw compounder at a second compounding temperature for a second compounding time to obtain a second polymer film composition of Examples 1 to 11 and Comparative Examples 1 to 9, respectively. The amount of the plasticizer is shown in Table 1-3 and Table 2-3; and the second dry-stirring temperature, the second dry-stirring time, the second compounding temperature and the second compounding time are shown in Table 1-4 and Table 2-4. The properties of the PVB, including the Mn, degree of acetalization, degree of acetylization and hydroxyl content, were measured according to the aforementioned testing methods, and the results are shown in Table 1-3 and Table 2-3. The units for the degree of acetalization, degree of acetylization and hydroxyl content are all mol %.

The second polymer film compositions of Examples 1 to 11 and Comparative Examples 1 to 9 were placed in an extruder to obtain a single-layer polymer film (hereinafter "second single-layer polymer film"), respectively. The melt indexes of the second single-layer polymer films were measured according to the aforementioned testing methods, and the results are shown in Table 1-5 and Table 2-5. Each of the second polymer film compositions was used as the material for the second layer of the polymer film of Examples 1 to 11 and Comparative Examples 1 to 9, as described below. Thus, the melt index of each of the second single-layer polymer films represents the melt index of the second layer of the polymer film, that is, the second melt index.

3.2.3. Manufacture of Polymer Film

The first polymer film compositions of Examples 1 to 11 and Comparative Examples 1 to 9, as well as the second polymer film compositions of Examples 1 to 11 and Comparative Examples 1 to 9, were respectively placed in a co-extruder to form a polymer film with a three-layer structure by co-extrusion. The total thickness of the polymer film is 0.8 mm, wherein the first layer and the third layer are formed from the first polymer film composition, and the thickness of each of the first layer and the third layer is 0.335 mm. The second layer is formed from the second polymer film composition, and the thickness of the second layer is 0.13 mm.

Afterwards, the two surfaces of the polymer film were subjected to preheating and machine embossing to form textures, thereby obtaining the polymer films of Examples 1 to 11 and Comparative Examples 1 to 9.

TABLE 1-1

Properties of first polymer film compositions of Examples 1 to 11

| | | | Properties | | | |
|---|---|---|---|---|---|---|
| Unit | | Mn | Content of hydroxyl mol % | Degree of acetylization mol % | Degree of acetalization mol % | Content of plasticizer parts by weight |
| Example | 1 | 113400 | 28.4 | 1.0 | 70.6 | 39 |
| | 2 | 105400 | 28.1 | 1.0 | 70.9 | 38.3 |
| | 3 | 107150 | 28.6 | 1.0 | 70.4 | 38 |
| | 4 | 117000 | 28.6 | 1.0 | 70.4 | 38 |
| | 5 | 107100 | 27.4 | 1.0 | 71.6 | 44 |
| | 6 | 107100 | 27.8 | 1.0 | 71.2 | 40 |
| | 7 | 107100 | 27.4 | 1.0 | 71.6 | 44 |
| | 8 | 115200 | 28.6 | 1.0 | 70.4 | 38 |
| | 9 | 108800 | 28.4 | 1.0 | 70.6 | 39 |
| | 10 | 107950 | 27.6 | 1.0 | 71.4 | 42 |
| | 11 | 113400 | 28.4 | 1.0 | 70.6 | 39 |

TABLE 1-2

Preparing parameters of first polymer film compositions of Examples 1 to 11

| | | Parameters | | | | |
|---|---|---|---|---|---|---|
| Unit | | Preheating temperature ° C. | First dry-stirring temperature ° C. | First dry-stirring time minute | First compounding temperature ° C. | First compounding time minute |
| Example | 1 | 35 | 35 | 3 | 190 | 8 |
| | 2 | 30 | 30 | 3 | 180 | 10 |
| | 3 | 30 | 30 | 3 | 180 | 12 |
| | 4 | 30 | 30 | 3 | 180 | 8 |
| | 5 | 45 | 45 | 2 | 210 | 12 |
| | 6 | 40 | 40 | 2 | 200 | 10 |
| | 7 | 45 | 45 | 2 | 210 | 12 |
| | 8 | 30 | 30 | 3 | 180 | 8 |
| | 9 | 40 | 40 | 2 | 200 | 8 |
| | 10 | 45 | 45 | 2 | 210 | 10 |
| | 11 | 35 | 35 | 3 | 190 | 8 |

TABLE 1-3

Properties of second polymer film compositions of Examples 1 to 11

| | | Properties | | | | |
|---|---|---|---|---|---|---|
| Unit | | Mn | Content of hydroxyl mol % | Degree of acetylization mol % | Degree of acetalization mol % | Content of plasticizer parts by weight |
| Example | 1 | 201600 | 27.0 | 8.2 | 64.8 | 60 |
| | 2 | 176400 | 25.6 | 8.2 | 66.2 | 65 |
| | 3 | 189000 | 24.8 | 10.3 | 64.9 | 70 |
| | 4 | 124000 | 22.0 | 8.6 | 69.4 | 80 |
| | 5 | 189000 | 22.5 | 12.0 | 65.5 | 80 |
| | 6 | 163800 | 23.4 | 7.0 | 69.6 | 75 |
| | 7 | 234000 | 26.8 | 8.5 | 64.7 | 60 |
| | 8 | 207900 | 25.9 | 7.3 | 66.8 | 65 |
| | 9 | 163800 | 22.8 | 7.9 | 69.3 | 80 |
| | 10 | 138600 | 23.7 | 7.6 | 68.7 | 75 |
| | 11 | 151200 | 24.2 | 9.4 | 66.4 | 70 |

TABLE 1-4

Preparing parameters of second polymer film compositions of Examples 1 to 11

| | | Parameters | | | | |
|---|---|---|---|---|---|---|
| Unit | | Preheating temperature ° C. | Second dry-stirring temperature ° C. | Second dry-stirring time minute | Second compounding temperature ° C. | Second compounding time minute |
| Example | 1 | 30 | 30 | 3 | 180 | 10 |
| | 2 | 35 | 35 | 3 | 190 | 8 |
| | 3 | 35 | 35 | 3 | 190 | 12 |
| | 4 | 45 | 45 | 2 | 210 | 12 |
| | 5 | 45 | 45 | 2 | 210 | 8 |
| | 6 | 40 | 40 | 2 | 200 | 10 |
| | 7 | 30 | 30 | 3 | 180 | 8 |
| | 8 | 30 | 30 | 3 | 180 | 11 |
| | 9 | 45 | 45 | 2 | 210 | 11 |
| | 10 | 40 | 40 | 2 | 200 | 12 |
| | 11 | 40 | 40 | 2 | 200 | 8 |

TABLE 1-5

Melt index of polymer films of Examples 1 to 11

| | Unit | | Fist melt index g/10 min | Second melt index g/10 min | Difference between second melt index and first melt index g/10 min |
|---|---|---|---|---|---|
| Example | 1 | | 2.1 | 3.8 | 1.7 |
| | 2 | | 1.7 | 4.8 | 3.1 |
| | 3 | | 1.9 | 5.5 | 3.6 |
| | 4 | | 1.5 | 10.0 | 8.5 |
| | 5 | | 3.3 | 9.4 | 6.1 |
| | 6 | | 2.6 | 7.4 | 4.8 |
| | 7 | | 3.3 | 3.5 | 0.2 |
| | 8 | | 1.5 | 3.9 | 2.4 |
| | 9 | | 2.3 | 9.9 | 7.6 |
| | 10 | | 3.0 | 8.2 | 5.2 |
| | 11 | | 2.1 | 6.2 | 4.1 |

TABLE 2-1

Properties of first polymer film compositions of Comparative Examples 1 to 9

| | Unit | | Mn | Content of hydroxyl mol % | Degree of acetylization mol % | Degree of acetalization mol % | Content of plasticizer parts by weight |
|---|---|---|---|---|---|---|---|
| Comparative Example | 1 | | 113400 | 28.6 | 1.0 | 70.4 | 38 |
| | 2 | | 117000 | 28.6 | 1.0 | 70.4 | 38 |
| | 3 | | 107100 | 28.6 | 1.0 | 70.4 | 38 |
| | 4 | | 115200 | 28.4 | 1.0 | 70.6 | 39 |
| | 5 | | 107100 | 27.6 | 1.0 | 71.4 | 42 |
| | 6 | | 105400 | 27.4 | 1.0 | 71.6 | 50 |
| | 7 | | 110500 | 27.6 | 1.0 | 71.4 | 42 |
| | 8 | | 117000 | 28.4 | 1.0 | 70.6 | 39 |
| | 9 | | 117000 | 28.4 | 1.0 | 70.6 | 39 |

TABLE 2-2

Preparing parameters of first polymer film compositions of Comparative Examples 1 to 9

| | Unit | | Preheating temperature ° C. | First dry-stirring temperature ° C. | First dry-stirring time minute | First compounding temperature ° C. | First compounding time minute |
|---|---|---|---|---|---|---|---|
| Comparative Example | 1 | | 30 | 30 | 3 | 180 | 8 |
| | 2 | | 30 | 30 | 3 | 180 | 8 |
| | 3 | | 30 | 30 | 3 | 180 | 12 |
| | 4 | | 35 | 35 | 3 | 190 | 8 |
| | 5 | | 45 | 45 | 2 | 210 | 10 |
| | 6 | | 50 | 50 | 1 | 220 | 10 |
| | 7 | | 45 | 45 | 2 | 210 | 10 |
| | 8 | | 30 | 30 | 3 | 180 | 8 |
| | 9 | | 30 | 30 | 3 | 180 | 8 |

TABLE 2-3

Properties of second polymer film compositions of Comparative Examples 1 to 9

| | Unit | | Mn | Content of hydroxyl mol % | Degree of acetylization mol % | Degree of acetalization mol % | Content of plasticizer parts by weight |
|---|---|---|---|---|---|---|---|
| Comparative Example | 1 | | 234000 | 28.4 | 7.2 | 64.4 | 40 |
| | 2 | | 113400 | 28.6 | 1.0 | 70.4 | 38 |
| | 3 | | 88200 | 28.4 | 7.4 | 64.2 | 40 |
| | 4 | | 138600 | 22.0 | 11.6 | 66.4 | 90 |

TABLE 2-3-continued

Properties of second polymer film compositions of Comparative Examples 1 to 9

| Unit | | Mn | Content of hydroxyl mol % | Degree of acetylization mol % | Degree of acetalization mol % | Content of plasticizer parts by weight |
|---|---|---|---|---|---|---|
| | 5 | 50400 | 26.4 | 1.0 | 72.6 | 40 |
| | 6 | 201600 | 27.0 | 8.2 | 64.8 | 60 |
| | 7 | 50400 | 26.4 | 1.0 | 72.6 | 70 |
| | 8 | 126000 | 27.2 | 8.2 | 64.6 | 60 |
| | 9 | 126000 | 27.2 | 8.2 | 64.6 | 60 |

TABLE 2-4

Preparing parameters of second polymer film compositions of Comparative Examples 1 to 9

| Unit | | Preheating temperature ° C. | Second dry-stirring temperature ° C. | Second dry-stirring time minute | Second compounding temperature ° C. | Second compounding time minute |
|---|---|---|---|---|---|---|
| Comparative Example | 1 | 20 | 20 | 1 | 150 | 6 |
| | 2 | 25 | 25 | 1 | 170 | 6 |
| | 3 | 28 | 28 | 1 | 175 | 7 |
| | 4 | 50 | 50 | 5 | 220 | 6 |
| | 5 | 50 | 50 | 8 | 240 | 14 |
| | 6 | 30 | 30 | 3 | 180 | 10 |
| | 7 | 50 | 50 | 6 | 230 | 6 |
| | 8 | 30 | 30 | 3 | 220 | 6 |
| | 9 | 20 | 20 | 1 | 180 | 8 |

TABLE 2-5

Melt index of polymer films of Comparative Examples 1 to 9

| Unit | | Fist melt index g/10 min | Second melt index g/10 min | Difference between second melt index and first melt index g/10 min |
|---|---|---|---|---|
| Comparative Example | 1 | 1.5 | 0.6 | −0.9 |
| | 2 | 1.5 | 1.5 | 0.0 |
| | 3 | 1.9 | 2.0 | 0.1 |
| | 4 | 2.1 | 10.7 | 8.6 |
| | 5 | 3.0 | 23.6 | 20.6 |
| | 6 | 3.9 | 3.8 | −0.1 |
| | 7 | 3.0 | 11.2 | 8.2 |
| | 8 | 1.5 | 10.2 | 8.7 |
| | 9 | 1.5 | 1.8 | 0.3 |

3.3. Manufacture and Property Evaluation of Laminated Glass

Laminated glasses were manufactured using the polymer films of Examples 1 to 11 and Comparative Examples 1 to 9, respectively. Initially, the polymer film was cut into 300 mm×300 mm. Then, two clean and transparent float glass sheets (length: 300 mm; width: 300 mm; thickness: 2 mm) were provided for each of the polymer films. The cut polymer films of Examples 1 to 11 and Comparative Examples 1 to 11 were interposed respectively between two transparent float glass sheets to obtain a laminated object. The laminated object was pre-pressed by vacuuming using nip rollers. The pre-pressing using nip rollers was performed as follows: the conveying rate of conveyor belt of roller press was set to 4.5 m/min, the temperature of oven was set to 180° C., and the pressure of rollers was set to 3 kg/cm². The laminated object was placed on the conveyor belt and passed through the oven and the rollers in sequence, wherein the distance between the rollers was set to 5 mm. Then, the pre-pressed laminated object was placed in an autoclave, subjected to hot-pressing with a pressure of 13 bar and a temperature of 135° C. for 120 minutes, and then cooled to room temperature to obtain the laminated glass.

The polymer films and laminated glasses of Examples 1 to 11 and Comparative Examples 1 to 9 were subjected to evaluation of continuous layer structure, evaluation of layer thickness, evaluation of loss factor, and evaluation of optical distortion according to the aforementioned testing methods. The results are listed in Table 3-1 and Table 3-2.

TABLE 3-1

Properties of polymer films and laminated glasses of Examples 1 to 11

| | | Continuous layer structure | Thickness of second layer | Deviation of thickness of second layer | Loss factor | Optical distortion |
|---|---|---|---|---|---|---|
| Example | 1 | ○ | ○ | 0 | 0.264 | No |
| | 2 | ○ | ○ | 0.005 | 0.268 | No |
| | 3 | ○ | ○ | 0.005 | 0.284 | No |
| | 4 | ○ | ○ | 0.01 | 0.274 | No |
| | 5 | ○ | ○ | 0.005 | 0.288 | No |
| | 6 | ○ | ○ | 0 | 0.271 | No |
| | 7 | ○ | ○ | 0.02 | 0.291 | No |
| | 8 | ○ | ○ | 0.025 | 0.287 | No |

TABLE 3-1-continued

Properties of polymer films and laminated glasses of Examples 1 to 11

| | Continuous layer structure | Thickness of second layer | Deviation of thickness of second layer | Loss factor | Optical distortion |
|---|---|---|---|---|---|
| 9 | ○ | ○ | 0.025 | 0.282 | No |
| 10 | ○ | ○ | 0.02 | 0.263 | No |
| 11 | ○ | ○ | 0.02 | 0.292 | No |

TABLE 3-2

Properties of polymer films and laminated glasses of Comparative Examples 1 to 9

| | | Continuous layer structure | Thickness of second layer | Deviation of thickness of second layer | Loss factor | Optical distortion |
|---|---|---|---|---|---|---|
| Comparative Example | 1 | x | NA | NA | 0.102 | Yes |
| | 2 | ○ | ○ | 0.01 | 0.118 | No |
| | 3 | ○ | ○ | 0.015 | 0.121 | No |
| | 4 | ○ | x | 0.09 | 0.117 | Yes |
| | 5 | ○ | x | 0.13 | 0.122 | Yes |
| | 6 | ○ | ○ | 0.02 | 0.231 | No |
| | 7 | ○ | x | 0.11 | 0.114 | Yes |
| | 8 | ○ | x | 0.08 | 0.115 | Yes |
| | 9 | ○ | ○ | 0.018 | 0.126 | No |

As shown in Table 3-1, Examples 1 to 11 demonstrate that the polymer films of the present invention exhibit a continuous layer structure, good structural uniformity, and a suitable and uniform thickness of the second layer. In particular, the laminated glasses manufactured from the polymer films of the present invention all have a loss factor larger than 0.25, indicating a good acoustic insulation effect. Meanwhile, the laminated glasses manufactured from the polymer films of the present invention do not exhibit optical distortion defects.

In contrast, as shown in Table 3-2, the polymer films that are not according to the present invention lack a continuous layer structure and exhibits an unsuitable and non-uniform thickness of the second layer. The laminated glasses manufactured from these polymer films have a loss factor lower than 0.25, indicating poor acoustic insulation effect. Additionally, the laminated glasses made from these polymer films have optical distortion defects. Particularly, Comparative Example 1 demonstrates that when the first melt index is larger than the second melt index and the difference between the second melt index and the first melt index falls outside the designated range, the polymer film cannot achieve a continuous second layer a with suitable thickness, resulting in a laminated glass with a loss factor lower than 0.25 and optical distortion defects. Comparative Examples 2, 3 and 6 show that, when the difference between the second melt index and the first melt index is lower than the designated range of the present invention, the laminated glass has a loss factor lower than 0.25, indicating poor acoustic insulation effect. Comparative Examples 4, 5 and 8 demonstrate that when the difference between the second melt index and the first melt index is larger than the designated range of the present invention, the second layer of the polymer film has an insufficient and uneven thickness, resulting in a laminated glass with a loss factor lower than 0.25 and optical distortion. Comparative Example 7 shows that when the second melt index is larger than the designated range, even the difference between the second melt index and the first melt index is within the designated range, the second layer of the polymer film has an insufficient and uneven thickness, leading to a laminated glass with a loss factor lower than 0.25 and optical distortion. Comparative Example 9 shows that when the second melt index is lower than the designated range, even the difference between the second melt index and the first melt index is within the designated range, the manufactured laminated glass has a loss factor lower than 0.25, indicating poor acoustic insulation effect.

The above examples are used to illustrate the principle and efficacy of the present invention and show the inventive features thereof, but are not used to limit the scope of the present invention. People skilled in this field may proceed with a variety of modifications and replacements based on the disclosures and suggestions of the invention as described. Therefore, the scope of protection of the present invention is that as defined in the claims as appended.

What is claimed is:

1. A polymer film, which sequentially comprises a first layer, a second layer and a third layer, and the two surfaces of the second layer are in contact with the first layer and the third layer, respectively, wherein the first layer has a first melt index, the second layer has a second melt index, and the third layer has a third melt index, wherein the second melt index ranges from 3.5 g/10 min to 10.0 g/10 min, the first melt index and the third melt index are independently lower than 3.5 g/10 min, and the difference between the second melt index and the first melt index and the difference between the second melt index and the third melt index independently range from 0.2 g/10 min to 8.5 g/10 min,
wherein the first layer, the second layer and the third layer independently comprise polyvinyl acetal and a plasticizer,
wherein based on 100 parts by weight of the polyvinyl acetal comprised in the first layer, the amount of the plasticizer comprised in the first layer ranges from 30 parts by weight to 50 parts by weight; based on 100 parts by weight of the polyvinyl acetal comprised in the second layer, the amount of the plasticizer comprised in the second layer ranges from 55 parts by weight to 85 parts by weight; and based on 100 parts by weight of the polyvinyl acetal comprised in the third layer, the amount of the plasticizer comprised in the third layer ranges from 30 parts by weight to 50 parts by weight,
wherein the thickness of the first layer and the third layer independently ranges from 250 μm to 450 μm, and the thickness of the second layer ranges from 50 μm to 250 μm.

2. The polymer film of claim 1, wherein the first melt index and the third melt index independently range from 1.5 g/10 min to 3.3 g/10 min.

3. The polymer film of claim 1, wherein the first melt index, the second melt index and the third melt index are measured in accordance with ASTM D1238 under 190° C. and a loading of 2.16 kg.

4. The polymer film of claim 1, wherein the first layer, the second layer and the third layer independently comprise poly (vinyl butyral).

5. The polymer film of claim 2, wherein the first layer, the second layer and the third layer independently comprise poly (vinyl butyral).

6. The polymer film of claim 1, wherein the polyvinyl acetal comprised in the second layer has a degree of acetalization ranging from 56 mol % to 74 mol %, a degree of acetylation ranging from 5 mol % to 15 mol %, and a content of hydroxyl ranging from 20 mol % to 30 mol %.

7. The polymer film of claim 2, wherein the polyvinyl acetal comprised in the second layer has a degree of acetalization ranging from 56 mol % to 74 mol %, a degree of acetylation ranging from 5 mol % to 15 mol %, and a content of hydroxyl ranging from 20 mol % to 30 mol %.

8. The polymer film of claim 1, wherein the polyvinyl acetal comprised in the first layer and the polyvinyl acetal comprised in the third layer independently have a degree of acetalization ranging from 60 mol % to 75 mol %, a degree of acetylation ranging from 0.1 mol % to 5 mol %, and a content of hydroxyl ranging from 20 mol % to 35 mol %.

9. The polymer film of claim 2, wherein the polyvinyl acetal comprised in the first layer and the polyvinyl acetal comprised in the third layer independently have a degree of acetalization ranging from 60 mol % to 75 mol %, a degree of acetylation ranging from 0.1 mol % to 5 mol %, and a content of hydroxyl ranging from 20 mol % to 35 mol %.

10. The polymer film of claim 1, wherein the polyvinyl acetal comprised in the second layer has a number average molecular weight (Mn) ranging from 100,000 to 240,000.

11. The polymer film of claim 2, wherein the polyvinyl acetal comprised in the second layer has a number average molecular weight (Mn) ranging from 100,000 to 240,000.

12. The polymer film of claim 1, wherein the polyvinyl acetal comprised in the first layer and the polyvinyl acetal comprised in the third layer independently have a number average molecular weight (Mn) ranging from 90,000 to 120,000.

13. The polymer film of claim 2, wherein the polyvinyl acetal comprised in the first layer and the polyvinyl acetal comprised in the third layer independently have a number average molecular weight (Mn) ranging from 90,000 to 120,000.

14. A laminated glass, which comprises a first glass sheet, an intermediate film, and a second glass sheet in sequence, wherein the intermediate film is provided by the polymer film of claim 1.

* * * * *